United States Patent
Theocharous et al.

(10) Patent No.: US 11,270,369 B2
(45) Date of Patent: Mar. 8, 2022

(54) SYSTEMS FOR GENERATING RECOMMENDATIONS

(71) Applicant: Adobe Inc., San Jose, CA (US)

(72) Inventors: Georgios Theocharous, San Jose, CA (US); Sridhar Mahadevan, Morgan Hill, CA (US); Anup Bandigadi Rao, San Jose, CA (US)

(73) Assignee: Adobe Inc., San Jose, CA (US)

( * ) Notice: Subject to any disclaimer, the term of this patent is extended or adjusted under 35 U.S.C. 154(b) by 2 days.

(21) Appl. No.: 16/779,074

(22) Filed: Jan. 31, 2020

(65) Prior Publication Data

US 2021/0241346 A1    Aug. 5, 2021

(51) Int. Cl.
*G06Q 30/00* (2012.01)
*G06Q 30/06* (2012.01)
*H04L 67/50* (2022.01)
*G06F 16/9535* (2019.01)

(52) U.S. Cl.
CPC ..... *G06Q 30/0631* (2013.01); *G06F 16/9535* (2019.01); *H04L 67/22* (2013.01)

(58) Field of Classification Search
CPC .. G06Q 30/0601–0645; G06F 16/9535; H04L 67/22
See application file for complete search history.

(56) References Cited

U.S. PATENT DOCUMENTS

| | | | |
|---|---|---|---|
| 10,467,307 B1* | 11/2019 | Chanda | G06F 16/9535 |
| 2017/0323268 A1* | 11/2017 | Zhang | G06Q 10/1053 |
| 2018/0011937 A1* | 1/2018 | Tikhonov | G06F 16/9535 |
| 2019/0073363 A1* | 3/2019 | Perez | G06F 16/335 |

OTHER PUBLICATIONS

Kelen, Domokos, Session Recommendation via Recurrent Neural Networks over Fisher Embedding Vectors, Aug. 10, 2019, ; 19(16):3498. https://doi.org/10.3390/s19163498 (Year: 2019).*

* cited by examiner

*Primary Examiner* — Marissa Thein
*Assistant Examiner* — Maria S. P. Heath
(74) *Attorney, Agent, or Firm* — FIG. 1 Patents

(57) ABSTRACT

In implementations of systems for generating recommendations, a computing device implements a recommendation system to receive prior interaction data describing prior interactions of entities with items. The recommendation system processes the prior interaction data and segments the entities into a first set and a second set. The entities included in the first set have greater numbers of prior interactions with the items than the entities included in the second set. The recommendation system then generates subset data describing a subset of the entities in the first set. This subset excludes entities having numbers of the prior interactions with the items below a threshold. The recommendation system forms a recommendation model based on the subset data and the system uses the recommendation model to generate a recommendation for display in a user interface.

20 Claims, 16 Drawing Sheets

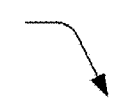

700

702
Receive prior interaction data describing entities and prior interactions of the entities with items

704
Process the prior interaction data to segment the entities into a first set and a second set, entities included in the first set having greater numbers of the prior interactions with the items than entities included in the second set

706
Generate subset data describing a subset of the entities in the first set, the subset excluding entities having numbers of the prior interactions with the items below a threshold

708
Form a recommendation model based on the subset data

710
Generate a recommendation for display in a user interface using the recommendation model

*Fig. 7*

SYSTEMS FOR GENERATING RECOMMENDATIONS

BACKGROUND

Systems for generating recommendations typically process data describing items and/or entities to identify a particular item as having an indication of relevancy for a particular entity. These systems then recommend the particular item to the particular entity based on the indication of relevancy. The indication of relevancy may be determined from prior interaction data describing interactions of the particular entity with the items and/or describing interactions of other entities with the items. This often includes a combination of specific scores such as a global score for numbers of interactions with the particular item by the other entities and a local score for numbers of interactions with the particular item by the particular entity.

For example, a system for recommending digital video content may generate a recommendation for the particular entity based at least partially on digital video content previously viewed by the particular entity (e.g., a local score for the digital video content). The recommendation for the particular entity may also be at least partially based on digital video content previously viewed by the other entities (e.g., a global score for the digital video content). In this example, the system for recommending digital video content determines an indication of relevancy for the particular entity based on some combination of these scores.

A shortcoming of conventional systems for generating recommendations is observable in scenarios in which the particular entity's interactions with the items are different from the interactions of the other entities with the items. In this scenario, conventional systems are slow to adjust to this difference in learning to generate recommendations for items that are relevant to the particular entity. For example, in Bayesian approaches, prior interaction data describing prior interactions of the entities with the items can be used as a prior probability distribution which is updated based on current interaction data describing current interactions with the items. Each of these updates is an iteration and conventional systems need many iterations to learn to generate recommendations for items that are relevant to the particular entity when the particular entity's interactions with the items are different from the interactions of the other entities with the items.

During these iterations, the particular entity receives many recommendations for items which are not relevant to the particular entity. This is undesirable for the particular entity and for providers of items which are relevant to the particular entity. Additionally, provision of many irrelevant recommendations is an inefficient use of computational resources and/or network resources.

SUMMARY

Systems and techniques are described for generating recommendations. In an example, a computing device implements a recommendation system to receive prior interaction data describing prior interactions of entities with items. The recommendation system segments the entities into a first set and a second set such that entities included in the first set have greater numbers of prior interactions with the items than the entities included in the second set. In one example, the recommendation system scales the numbers of prior interactions with the items by the entities in the first set to a scale between 0 and 1.

The recommendation system then generates subset data describing a subset of the entities in the first set. This subset excludes entities having numbers of the prior interactions with the items below a threshold. For example, the first set may include the top K entities having the greatest numbers of prior interactions with the items from the interaction data. The subset may include the top N entities having the greatest numbers of prior interactions with the items from the first set such that N is less than K. In an example, the recommendation system determines a value of N as a number of peaks in the scaled numbers of prior interactions of the entities in the first set.

The recommendation system forms a recommendation model based on the subset data. For example, the computing device implements the recommendation system to receive current interaction data describing current interactions of an entity with the items. The recommendation system uses the recommendation model and the current interaction data to generate a recommendation for display in a user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 7 is a flow diagram depicting a procedure in an example implementation in which prior interaction data describing entities and prior interactions of the entities with items is received, a recommendation model is formed, and a recommendation is generated for display in a user interface using the recommendation model.

DETAILED DESCRIPTION

Overview

Figure 1:
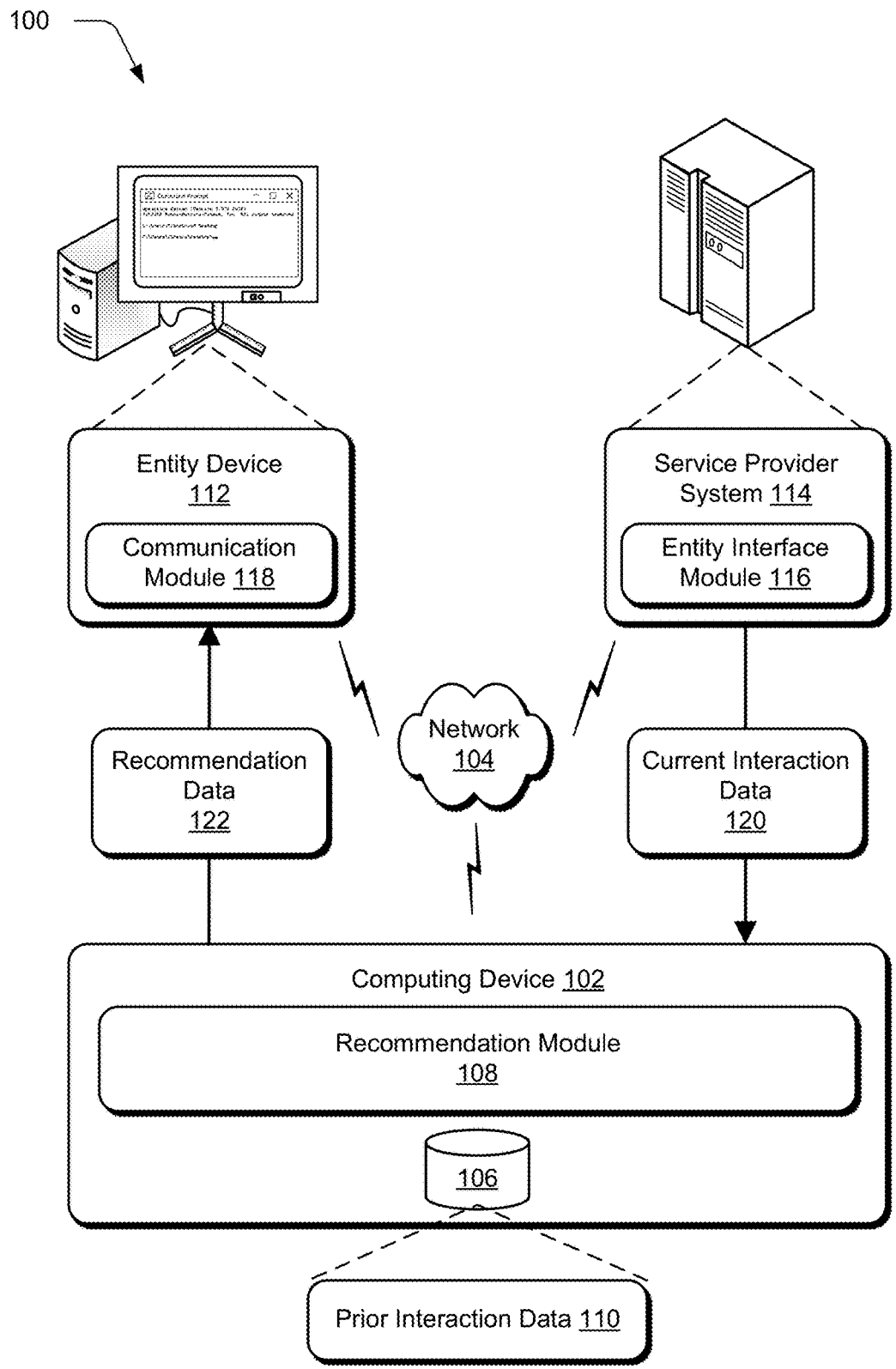
FIG. 1 is an illustration of an environment in an example implementation that is operable to employ digital systems and techniques for generating recommendations as described herein.

Conventional systems for generating recommendations determine relevancy of a particular item of a group of items for a particular entity of a group of entities by combining a global score, a local score, and a temporal score. The global score is based on numbers of interactions with the particular item by entities of the group of entities. The local score is based on numbers of interactions with the particular item by the particular entity. The temporal score is based on a most recent interaction with the particular item. For example, conventional systems may determine the relevancy of the particular item for the particular entity as an average of these three scores.

In scenarios in which the particular entity's interactions with items of the group of items are different from interactions with the items by the entities of the group of entities, conventional systems are slow to adjust for this difference when learning to generate additional recommendations for items that are relevant to the particular entity. As a result, the particular entity receives many recommendations for items which are not relevant to the particular entity before a conventional system learns to generate recommendations for items that are relevant to the particular entity. This is undesirable for the particular entity and a waste of computational and/or network resources.

Techniques are described for generating recommendations. In an example, a computing device implements a recommendation system to receive prior interaction data describing prior interactions of entities with items. The recommendation system also receives current interaction data describing current interactions of a particular entity with the items.

The recommendation system processes the prior interaction data to segment the entities into a first set and a second set such that entities included in the first set have greater numbers of prior interactions with the items than the entities included in the second set. In this way, the first set includes the top K entities having the greatest numbers of prior interactions with the items from the prior interaction data. The recommendation system can determine a value of K using a variety of techniques such as experimentally, heuristically, statistically, etc.

In one example, the recommendation system scales the numbers of prior interactions with the items by the entities in the first set to a scale between 0 and 1. The system analyzes the scaled numbers of prior interactions to identify peaks which can be used as a metric to generate a subset of the entities included in the first set. For example, the recommendation system may generate the subset to include the top N entities having the greatest number of prior interactions with the items from the first set. In this example, the recommendation system determines a value of N as a number of peaks identified in the scaled numbers of prior interactions.

The recommendation system then generates subset data describing the subset of the entities in the first set. This subset excludes entities having numbers of the prior interactions with the items below a threshold. The recommendation system forms a recommendation model based on the subset data. The recommendation model can be formed using multiple approaches such as Bayesian approaches. In one example, forming the recommendation model includes sampling from a Dirichlet multinomial distribution. In another example, forming the recommendation model includes Thompson sampling. The recommendation system uses the recommendation model and the current interaction data to generate a recommendation for display in a user interface.

The described systems and techniques improve conventional recommendation generation technology which generates recommendations using all of the prior interactions of entities with the items as a prior probability distribution. Because conventional systems use of all of the prior interactions of the entities with the items as the prior probability distribution, the conventional systems are computationally burdensome and slow to learn to generate relevant recommendations. By segmenting these entities into a first set of entities and determining a subset of the first set of entities as a basis for a prior probability distribution, the described systems quickly learn to generate recommendations for items that are relevant to a specific entity of a group of entities even in scenarios in which the specific entity's interactions with the items are different from the interactions with the items by entities of the group.

Additionally, the described systems demonstrate significant improvements in performance relative to the conventional system. For example, regret can describe a difference between a generated recommendation for an item and an optimal recommendation for an item at an iteration, and accumulated regret is a sum of regret at each of multiple iterations. A comparison of accumulated regret calculated using the conventional system and the described systems to generate recommendations demonstrates that the described systems and techniques have lower accumulated regret than the conventional system. This improvement is validated experimentally by identifying and generating recommendations of items for individual entities of a group of entities having interactions with the items that are closest to the top K entities of the group, furthest from the top K entities of the group, and median to the top K entities of the group.

The described techniques also improve computational efficiency of the computing device relative to conventional techniques which generate recommendations using all of the prior interactions of entities with the items as a prior probability distribution. By using the subset of the first set of entities as a basis for a prior probability distribution, the described systems process less data than conventional systems while also demonstrating superior performance over the conventional systems. The described techniques further improve computational efficiency by achieving this superior performance in fewer iterations than the conventional systems.

Term Descriptions

As used herein, the term "item" refers to information, a product, and/or a service for which a recommendation can be generated.

As used herein, the term "entity" refers to a device, a group of devices, a device user, and/or a group of device users capable of interacting with an item.

As used herein, the term "regret" refers to data that describes a difference between an optimal event and an actual event. By way of example, regret may be a calculated difference between a generated recommendation for an item and an optimal recommendation for an item at an iteration.

As used herein, the term "accumulated regret" refers to data that describes a sum of regret at each of multiple events. By way of example, accumulated regret may be a sum of regret at each of multiple iterations. For example, accumulated regret can be used as a metric to compare performance of systems for generating recommendations in which a lower accumulated regret generally corresponds to a better performance.

As used herein, the term "recommendation model" refers to a computer-implemented algorithm or computer-implemented algorithms which can apply various metrics to data describing interactions of entities with items to output a recommendation of a particular item for a particular entity. By way of example, data describing the particular item may or may not be included in the data describing interactions of entities with items. For example, data describing the particular entity may or may not be included in the data describing interactions of entities with items.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques for generating recommendations as described herein. The illustrated environment 100 includes a computing device 102 connected to a network 104. The computing device 102 may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, the computing device 102 may be representative of a plurality of different devices, such as multiple servers utilized by a business to perform operations "over the cloud."

The computing device 102 includes a storage device 106 and a recommendation module 108. The recommendation module 108 is illustrated as having, transmitting, and/or receiving prior interaction data 110. The prior interaction data 110 describes entities and prior interactions of the entities with items. As shown, the illustrated environment 100 includes an entity device 112 and a service provider system 114 which are each connected to the network 104. Although a single entity device 112 and a single service provider system 114 are illustrated, it is to be understood that the entity device 112 can be representative of multiple entity devices 112 and the service provider system 114 may be representative of multiple service provider systems 114.

The service provider system 114 includes an entity interface module 116 and the service provider system 114 implements the entity interface module 116 to make items available for interaction. Examples of items include products, services, information, etc. The entity device 112 includes a communication module 118 and the entity device 112 implements the communication module 118 to interact with items made available by the service provider system 114.

Consider an example in which items include digital content items and the service provider system 114 makes the digital content items available for interaction via the network 104. In this example, the entity device 112 implements the communication module 118 to interact with the digital content items via the network 104. This interaction can include, for example, browsing a collection of digital movies made available by the service provider system 114 for streaming via the network 104. The interaction may also include downloading of a digital image made available by the service provider system 114 for downloading via the network 104.

Continuing the previous example, the computing device 102 can implement the recommendation module 108 to receive current interaction data 120 describing current interactions of the entity device 112 with items made available for interaction by the service provider system 114. The recommendation module 108 processes the current interaction data 120 and the prior interaction data 110 to generate recommendation data 122. This recommendation data 122 describes an item recommended for the entity device 112 based on the prior interaction data 110 and the current interaction data 120. For example, the item recommended for the entity device 112 can be an item made available for interaction by the service provider system 114 via the network 104.

Consider another example in which the prior interaction data 110 describes numbers of interactions by entities with items and the current interaction data 120 describes numbers of interactions by the entity device 112 with items. In this example, the prior interaction data 110 is generalized as including information describing multiple entities interacting with multiple items whereas the current interaction data 120 is specific to interactions with items by the entity device 112. The recommendation module 108 leverages both the prior interaction data 110 and the current interaction data 120 to generate the recommendation data 122 as including a recommendation for an item determined to be relevant to the entity device 112.

The entity device 112 receives the recommendation data 122 describing the item determined to be relevant to the entity device 112 as a recommendation for the item. The entity device 112 can accept the recommendation for the item and interact with the item, e.g., via the network 104. Alternatively, the entity device 112 may reject or ignore the recommendation for the item such as by interacting with a different item made available for interaction by the service provide system 114. The service provider system 114 generates updated current interaction data 120 describing how the entity device 112 responds to the recommendation data 122. The recommendation module 108 can receive the updated current interaction data 120 and process the updated current interaction data 120 to improve recommendations for the entity device 112 such as by recommending another item having increased relevancy to the entity device 112.

Figure 2:
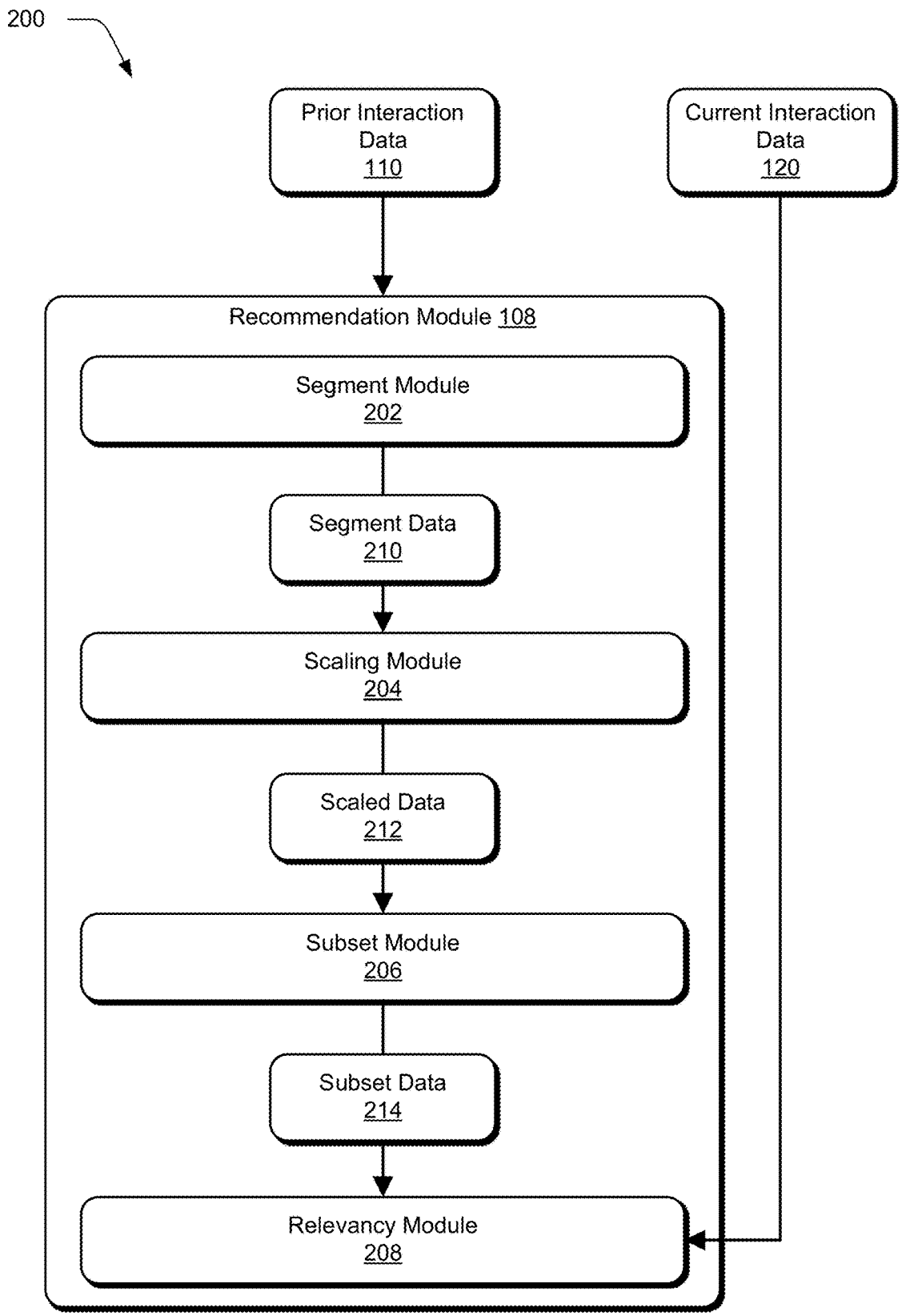
FIG. 2 depicts a system in an example implementation showing operation of a recommendation module for generating recommendations.

FIG. 2 depicts a system 200 in an example implementation showing operation of a recommendation module 108 for generating recommendations. The recommendation module 108 is illustrated as receiving the prior interaction data 110 and the current interaction data 120. The recommendation module 108 is further illustrated to include a segment module 202, a scaling module 204, a subset module 206, and a relevancy module 208. The segment module 202 receives the prior interaction data 110 and the segment module 202 processes the prior interaction data 110 to generate segment data 210.

Figure 3:
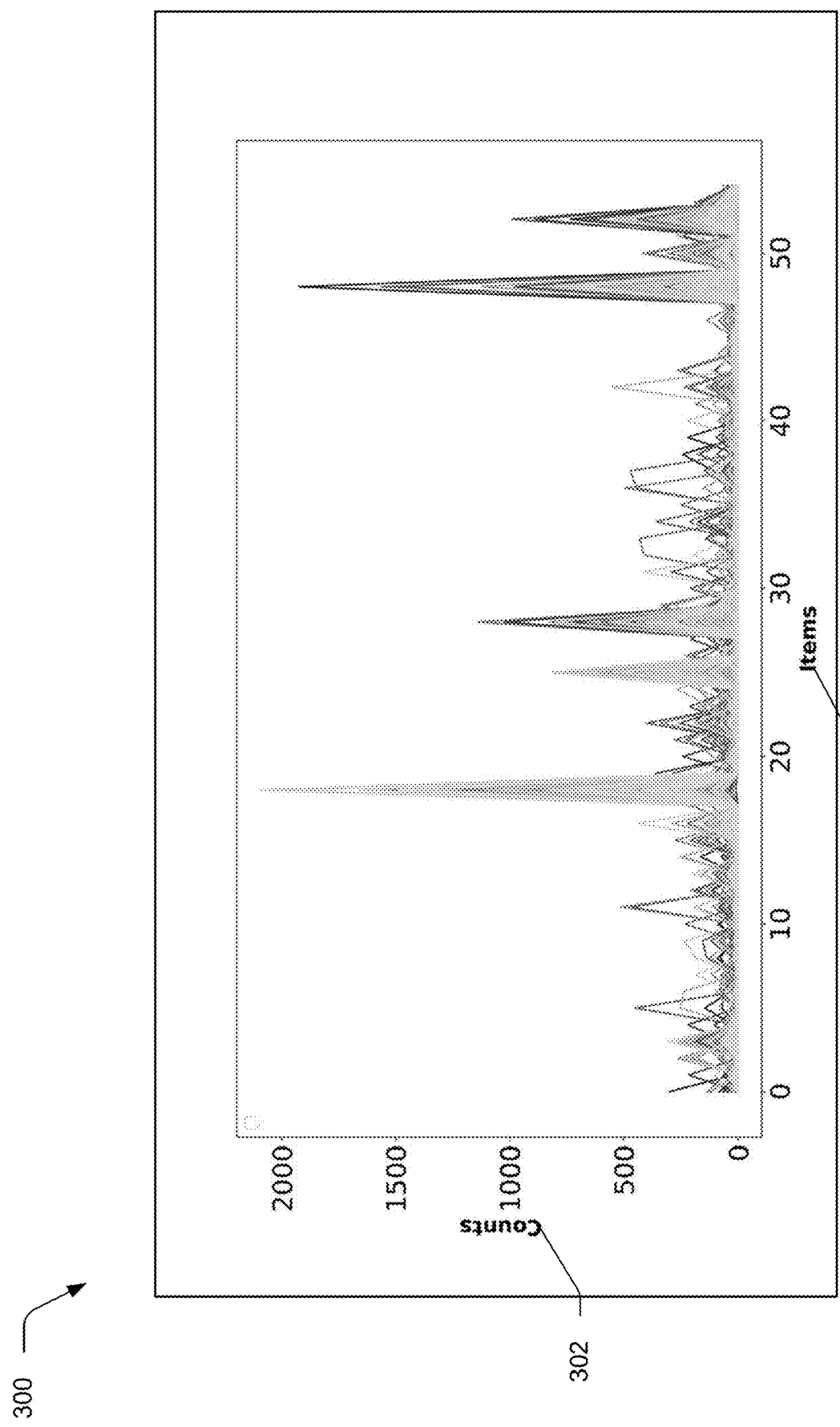
FIG. 3 is an illustration of an example representation of prior interaction data.

FIG. 3 is an illustration of an example representation 300 of prior interaction data 110. The representation 300 illustrates numbers of prior interactions 302 of entities with items 304. As shown, the prior interaction data 110 includes many entities and many items 304 and the segment module 202 processes the prior interaction data 110 to segment the entities into a first set and a second set. The first set includes the top K entities based on numbers of prior interactions 302 with items 304. Therefore, in an example in which the value of K is 10, the first set would include the 10 entities having the greatest numbers of prior interactions 302 with items 304. The second set includes the entities included in the interaction data 110 which are not included in the first set. Continuing the example in which the value of K is ten, each of the 10 entities included in the first set has greater numbers of prior interactions 302 with items 304 than any of the entities included in the second set.

The value of K can be determined using a variety of techniques. For example, the value of K may be determined experimentally, e.g., the value of K may be determined using optimization techniques. In one example, the value of K can be determined using a heuristic approach. In another example, the value of K may be determined based a statistical guarantee or multiple statistical guarantees. In other examples, the value of K may be determined based on computational considerations or other considerations.

Figure 4:
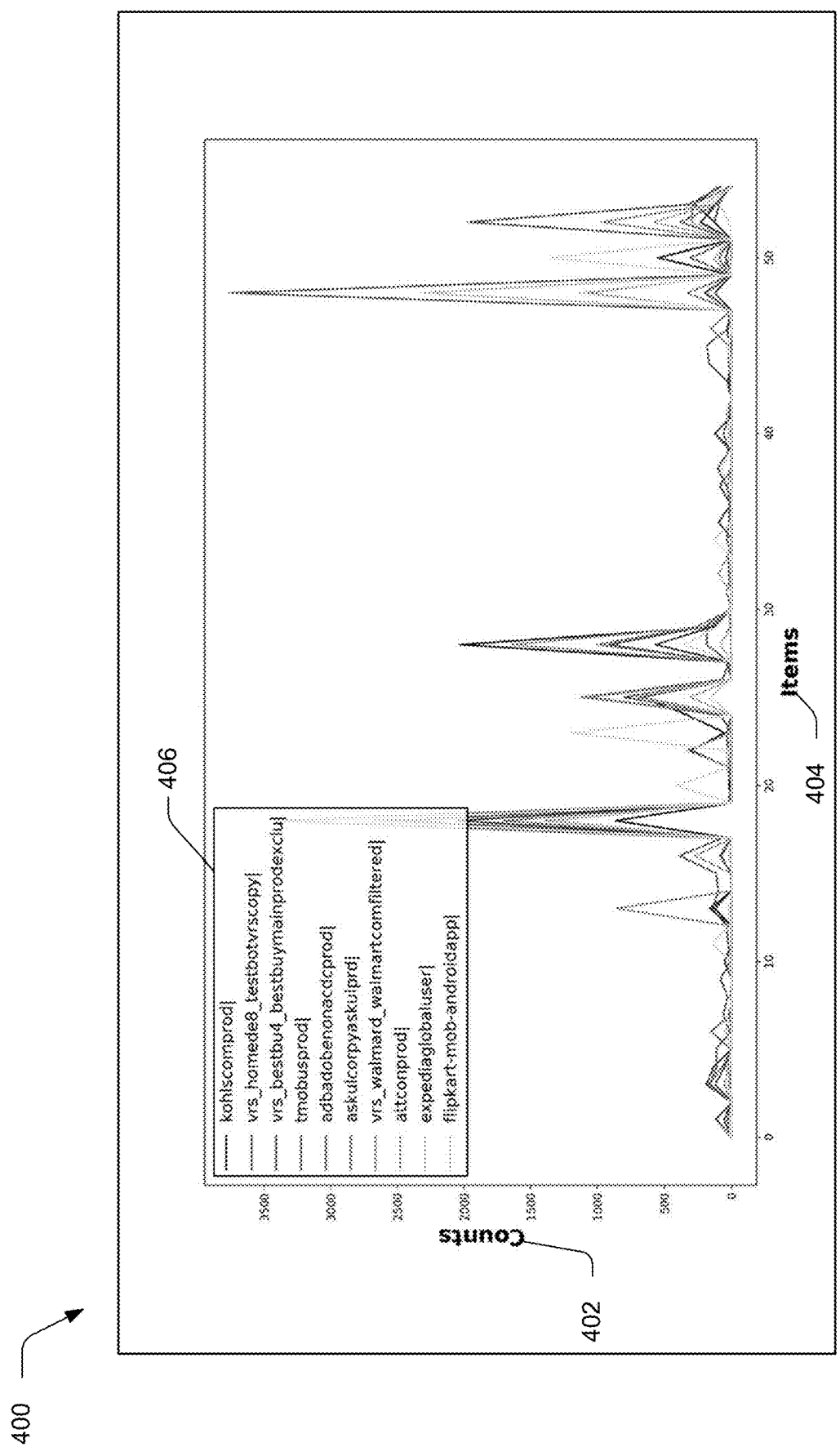
FIG. 4 is an illustration of an example representation of segment data.

The segment module 202 generates the segment data 210 to describe the entities included in the first set. FIG. 4 is an illustration of an example representation 400 of segment data 210. The representation 400 illustrates numbers of prior interactions 402 of entities included in the first set with items 404. As shown, the first set includes 10 entities which are identifiable by entity identifications 406. Thus, the value of K is 10 in this example.

The scaling module 204 receives the segment data 210 describing the numbers of prior interactions 402 of entities in the first set with items 404 and the scaling module 204 processes the segment data 210 to generate scaled data 212. To do so, the scaling module 204 scales the numbers of prior interactions 402 with items 404 between 0 and 1. For example, the scaling module 204 may determine a maximum number of prior interactions 402 with items 404 included in the segment data 210. The scaling module 204 may scale the numbers of prior interactions 402, for example, by dividing the numbers by the maximum number. The scaling module 204 then generates the scaled data 212 which describes the scaled numbers of prior interactions 402 of entities in the first set with items 404.

Figure 5:
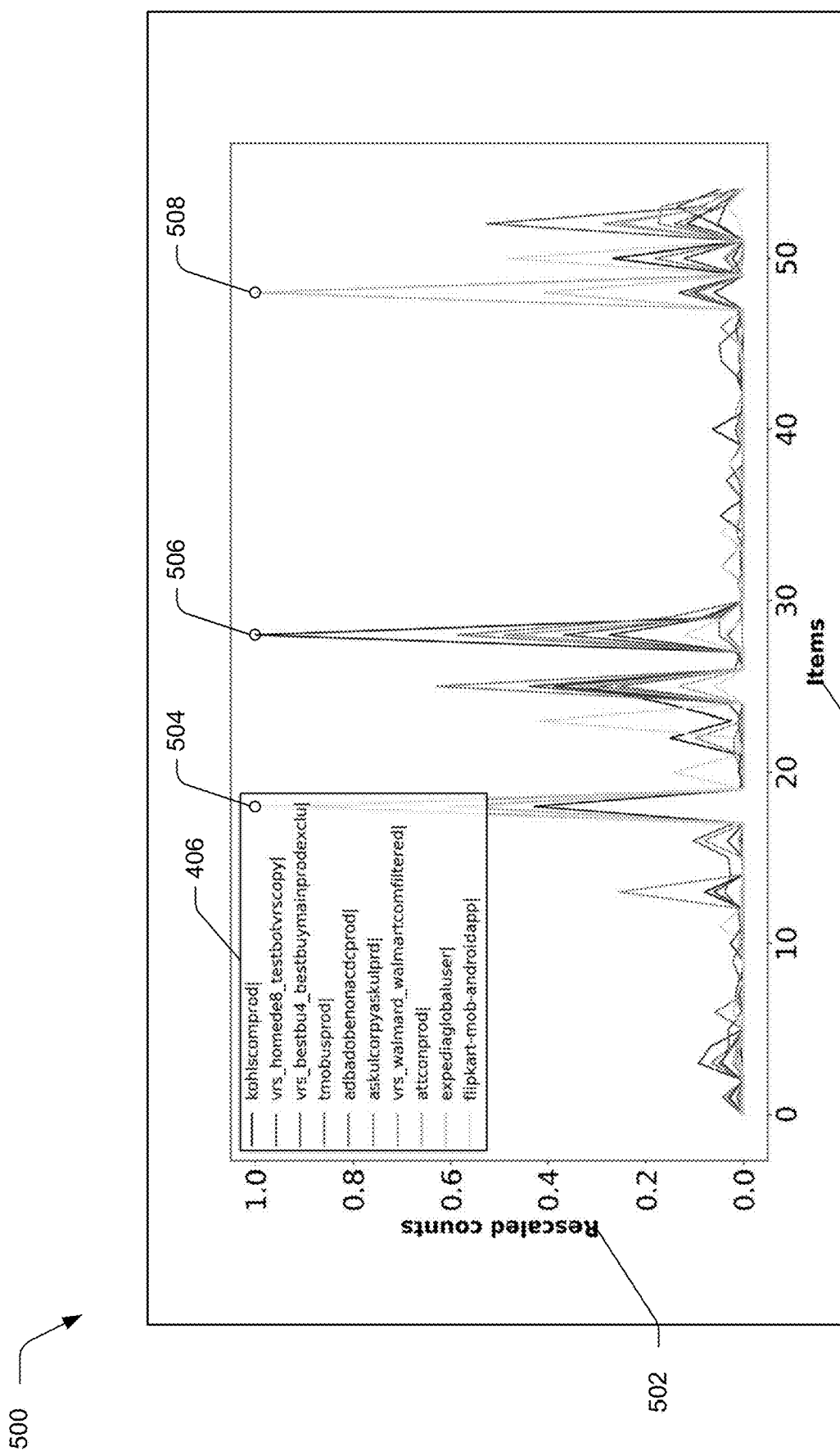
FIG. 5 is an illustration of an example representation of scaled data.

FIG. 5 is an illustration of an example representation 500 of scaled data 212. The representation 500 illustrates scaled numbers of prior interactions 502 by the entities included in the first set with items 404. As shown in FIG. 5, the scaled numbers of prior interactions 502 include three peaks 504-508. The subset module 206 receives the scaled data 212 and the subset module 206 processes the scaled data 212 to generate subset data 214. The subset module 206 generates the subset data 214 by removing entities from the first set. For example, the subset module 206 may exclude entities having scaled numbers of prior interactions 502 with items 404 below a threshold. As a result, the subset data 214 describes a subset of the entities in the first set.

In one example, the subset module 206 generates the subset data 214 by determining the top N entities based on scaled numbers of prior interactions 502 with items 404. In this example, the subset module 206 generates the subset data 214 to include the top N entities. In an example in which the value of N is three, the subset would include the three entities having the greatest scaled numbers of prior interactions 502 with items 404. The subset module 214 then generates the subset data 214 to describe the subset of entities in the first set.

The value of N can be determined using a variety of techniques. In general, the value of N is less than the value of K. In one example, the subset module 206 may determine the value of N as being equal to a number of peaks in the scaled numbers of prior interactions 502 with items 404. In this example, there are three peaks 504-508 so the subset module 206 determines the value of N to equal three. Accordingly, the subset includes the three entities of the entities in the first set having the greatest scaled numbers of prior interactions 502 with items 404.

The value of N may be determined in other ways as well. For example, the value of N may be determined experimentally, e.g., using optimization techniques. The value of N can also be determined using a heuristic approach. In another example, the value of N may be determined based a statistical guarantee or multiple statistical guarantees. In other examples, the value of N may be determined based on computational considerations or other considerations.

Figure 6:
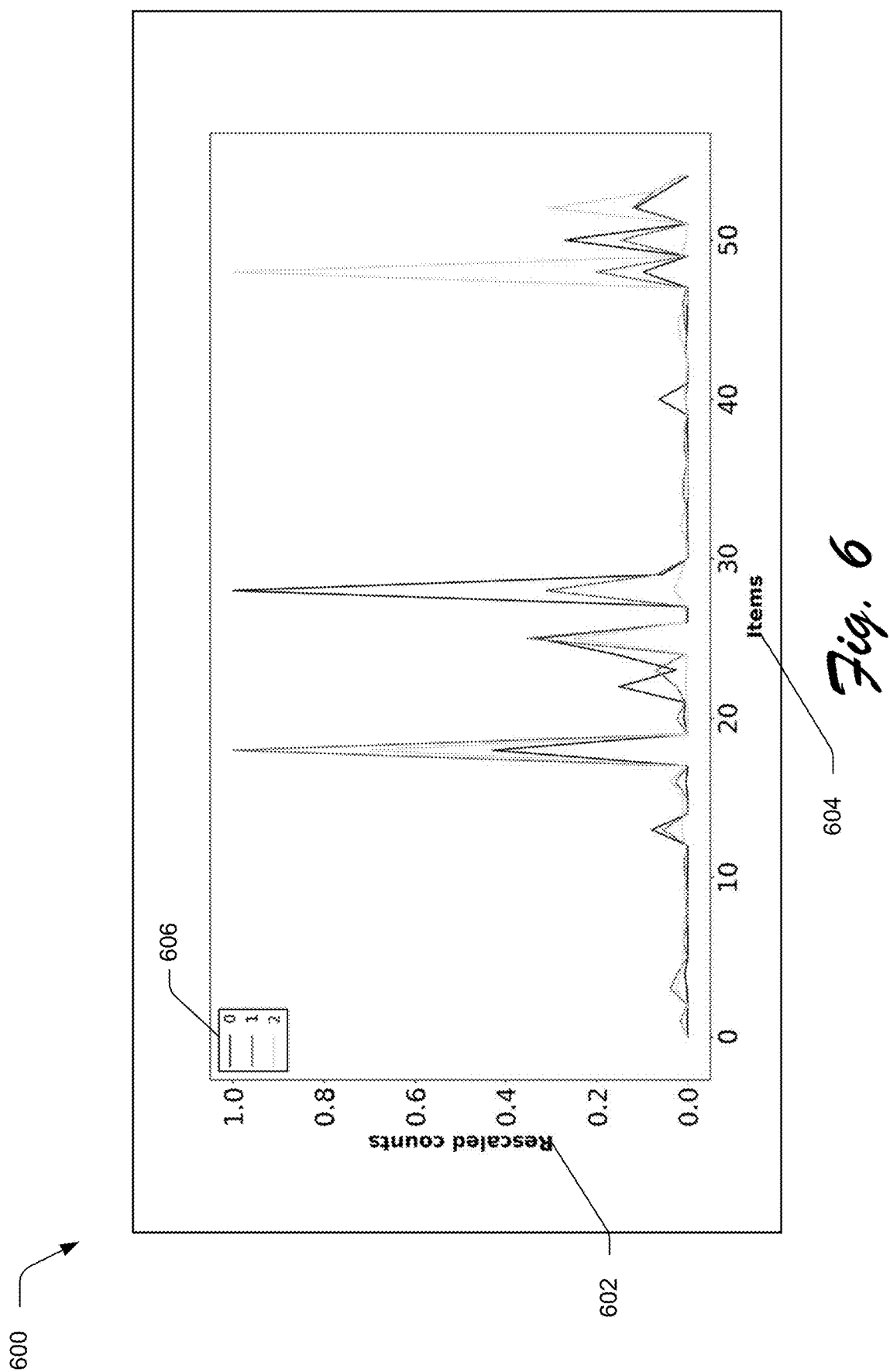
FIG. 6 is an illustration of an example representation of subset data.

The relevancy module 208 receives the subset data 214 and the current interaction data 120, and the relevancy module 208 processes the subset data 214 and the current interaction data 120 to generate a recommendation. FIG. 6 is an illustration of an example representation 600 of subset data 214. The representation 600 illustrates scaled numbers of prior interactions 602 of the three entities included in the subset with items 604. These three entities are identifiable by entity identifiers 606.

The relevancy module 208 can process the subset data 214 and then use the processed subset data 214 as a prior probability distribution of a Bayesian statistical inference. In this way, the relevancy module 208 can combine the subset data 214 and the current interaction data 120 to generate recommendations using Bayesian approaches. For example, the relevancy module 208 sums the scaled numbers of prior interactions 602 of the three entities included in the subset with items 604 into a global vector.

The relevancy module 208 may then scale the global vector to be within a range R which can be determined, e.g., through empirical simulations, using a heuristic approach, based on a statistical guarantee, etc. The scaled global vector can be normalized with a current interaction vector described in the current interaction data 120. The normalized vectors can be added and then normalized again to generate a preference vector for items 304. In this manner, the range R can be considered a maximum number of steps that an entity corresponding to the current interaction vector would have to change if the entity's preferences were completely different from the global vector. Thus, scaling the global vector to be within the range R is scaling the global vector to be within a preference range.

Several examples of combining the global vector and the current interaction vector using Bayesian approaches are contemplated. In one example, a multinomial distribution is maintained with a Dirichlet prior. In this example, the first prior is computed from the scaled global vector. In other examples, Thompson sampling may be employed to address the exploration-exploitation dilemma in the multi-armed bandit problem. For example, Thompson sampling with Bernoulli arms is contemplated such that beta priors for each arm are set using the scaled global vector. In this example, during updates, each arm is updated based on which item an entity selected and not the item recommended. In this manner, differences between the scaled global vector and the current interaction vector are counteracted.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to FIGS. 1-6.

FIG. 7 is a flow diagram depicting a procedure 700 in an example implementation in which prior interaction data describing entities and prior interactions of the entities with items is received, a recommendation model is formed, and a recommendation is generated for display in a user interface using the recommendation model. Prior interaction data describing entities and prior interactions of the entities with items is received (block 702). For example, the computing device 102 implements the recommendation module 108 to receive the prior interaction data. The prior interaction data is processed to segment the entities into a first set and a second set (block 704), entities included in the first set having greater numbers of the prior interactions with the items than entities included in the second set. The recommendation module 108 can process the prior interaction data to segment the entities into the first set and the second set. In one example, each entity described by the prior interaction data can be associated with a particular number of prior interactions with the items. In this example, the first set may include the top K entities associated with the greatest numbers of prior interactions with the items.

Subset data describing a subset of the entities in the first set is generated (block 706), the subset excluding entities having numbers of the prior interactions with the items below a threshold. The computing device 102 implements the recommendation module 108 to generate the subset data. For example, each entity of the K entities included in the first set may be associated with a particular number of prior interactions with the items. In this example, the subset can include the top N entities associated with the greatest numbers of prior interaction with the items such that N is less than K.

A recommendation model is formed (block 708) based on the subset data. The recommendation module 108 forms the recommendation model based on the subset data. A recommendation is generated for display in a user interface using the recommendation model (block 710). For example, the recommendation module 108 generates the recommendation using the recommendation model.

Figure 8:
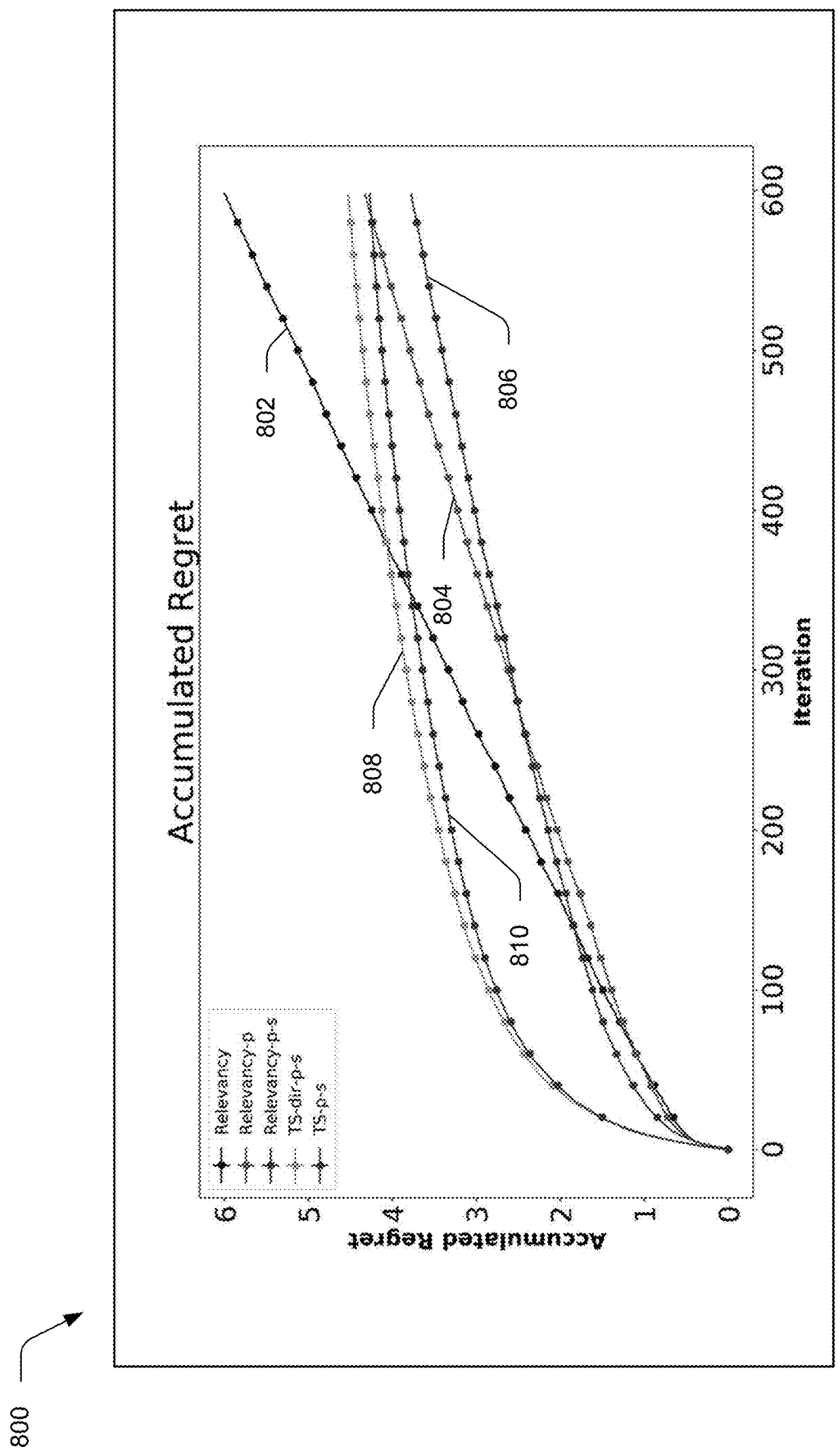
FIG. 8 is an illustration of an example representation of accumulated regret after iterations of recommendations using conventional systems and the described systems and techniques.

FIG. 8 is an illustration of an example representation 800 of accumulated regret after iterations of recommendations using conventional systems and the described systems and techniques. The recommendation module 108 generates recommendations based on a relevancy determination which is calculated as an average of three scores. Each of these three scores reflects a relevancy consideration as part of generating a recommendation of a particular item for a particular entity of a group of entities. The relevancy of the particular item is determined based on the average of score 1, score 2, and score 3.

In conventional systems, score 1 is a frequency score for the particular item based on prior interactions of all entities of the group of entities; score 2 is a frequency score for the particular entity for which the particular item is being considered; and score 3 is a temporal score based on how recently the particular item has been the subject of an interaction. For example, score 3 of conventional systems is determined as zero if the particular item has not be the subject of an interaction within a most recent hour. If the particular item has been the subject of an interaction within the most recent hour, then conventional systems can calculate score 3 as decreasing linearly based on a number of seconds since a most recent interaction with the particular item.

In some examples, the described systems replace score 3 of conventional systems with a score that considers how many interactions with items have occurred since the most recent interaction with the particular item. For example, a number of interactions that have occurred since the most recent interaction with the particular item may be leveraged exponentially to replace score 3 of conventional systems. In one example, the described systems replace score 3 of conventional systems with a score that is not necessarily zero if the particular item has not been the subject of an interaction within the most recent hour.

The representation 800 illustrates accumulated regret 802 over iterations of recommendations using a conventional system as well as accumulated regrets 804-810 over the same iterations using the described systems. For example, regret may describe a difference between a generated recommendation for an item and an optimal recommendation for an item at an iteration and the accumulated regrets 802-810 can be the cumulative sum of the regrets of the iterations. In this way, the accumulated regrets 802-810 are a measure of performance which is usable to compare systems for generating recommendations. In comparison, a first system for generating recommendations performs better than a second system for generating recommendations if the first system has lower accumulated regret than the second system.

The described system corresponding to the accumulated regret 804 replaces score 1 of the conventional systems with a frequency score for the particular item based on numbers of interactions with the particular item by the entities included in the first set instead of all of the entities included in the prior interaction data 110. With respect to previous examples, the conventional system corresponding to the accumulated regret 802 uses frequency scores for numbers of interactions with the particular item by all the entities illustrated in FIG. 3 to calculate score 1. The described system corresponding to the accumulated regret 804 uses frequency scores for numbers of interactions with the particular item by the entities illustrated in FIG. 4 to calculate score 1. In this mariner, the described system corresponding to the accumulated regret 804 calculates score 1 based on frequency scores of numbers of interactions with the particular item by the top K entities having the greatest numbers of prior interactions 302 with items 304.

As shown in FIG. 8, as numbers of iterations increase, the described system corresponding to the accumulated regret 804 is an improvement relative to the conventional system corresponding to the accumulated regret 802. This is because the accumulated regret 804 is less than the accumulated regret 802 before the first 100 iterations. By calculating score 1 using numbers of interactions with the particular item by the top K entities included in the first set, the described system corresponding to the accumulated regret 804 improves conventional recommendation generation technology which calculates score 1 using numbers of interactions with the particular item by all of the entities included in the prior interaction data 110.

The described system corresponding to the accumulated regret 806 replaces score 1 of the conventional systems with a frequency score for the particular item based on numbers of interactions with the particular item by the entities included in the subset of the first set instead of all of the entities. With respect to previous examples, the described system corresponding to the accumulated regret 806 uses frequency scores for numbers of interactions with the particular item by the entities illustrated in FIG. 6 to calculate score 1. Thus, the described system corresponding to the accumulated regret 806 calculates score 1 based on frequency scores of numbers of interactions with the particular item by the top N entities having the greatest scaled numbers of prior interactions 602 with items 604.

As illustrated, the described system corresponding to the accumulated regret 806 is an improvement over the described system corresponding to the accumulated regret 804 in this example. This is because the accumulated regret 806 is less than the accumulated regret 804 before the first 300 iterations. By calculating score 1 using number of interactions with the particular item by the top N entities included in subset of the first set, the described system corresponding to the accumulated regret 806 further improves conventional recommendation generation technology which calculates score 1 using numbers of interactions with the particular item by all of the entities included in the prior interaction data 110.

The described system corresponding to the accumulated regret 808 also replaces score 1 of the conventional systems with a frequency score for the particular item based on numbers of interactions with the particular item by the entities included in the subset which are illustrated in FIG. 6. The described system corresponding to the accumulated regret 808 also calculates score 1 based on frequency scores of numbers of interactions with the particular item by the top N entities having the greatest scaled numbers of prior interactions 602 with items 604. In addition, this described system maintains a multinomial distribution with a Dirichlet prior. As illustrated, the described system corresponding to the accumulated regret 808 is an improvement relative to the conventional system corresponding to the accumulated regret 802 after about 400 iterations.

The described system corresponding to the accumulated regret 810 additionally replaces score 1 of the conventional systems with a frequency score for the particular item based on numbers of interactions with the particular item by the entities included in the subset. This described system also calculates score 1 based on frequency scores of numbers of interactions with the particular item by the top N entities having the greatest scaled numbers of prior interactions 602 with items 604. In particular, the described system corresponding to the accumulated regret 810 employs Thompson sampling with Bernoulli arms. The beta priors for the arms of this described system are set according to the scaled global vector. During iterations, the arms are updated based on items chosen by an entity not the item recommended. The described system corresponding to the accumulated regret 810 is an improvement relative to the conventional system corresponding to the accumulated regret 802 after about 350 iterations. This is because the accumulated regret 810 is less than the accumulated regret 802 after about 350 iterations.

As shown in FIG. 8, each of the described systems corresponding to one of the accumulated regrets 804-810 is an improvement relative to the conventional system which corresponds to the accumulated regret 802. Thus, the described systems and techniques represent a significant improvement in computer-based recommendation generation technology. Specifically, the described systems all demonstrate lower accumulated regret over the iterations compared to the conventional systems. The described systems further improve relative to conventional computer-based recommendation generation technology as the number of iterations is increased.

Figure 9:
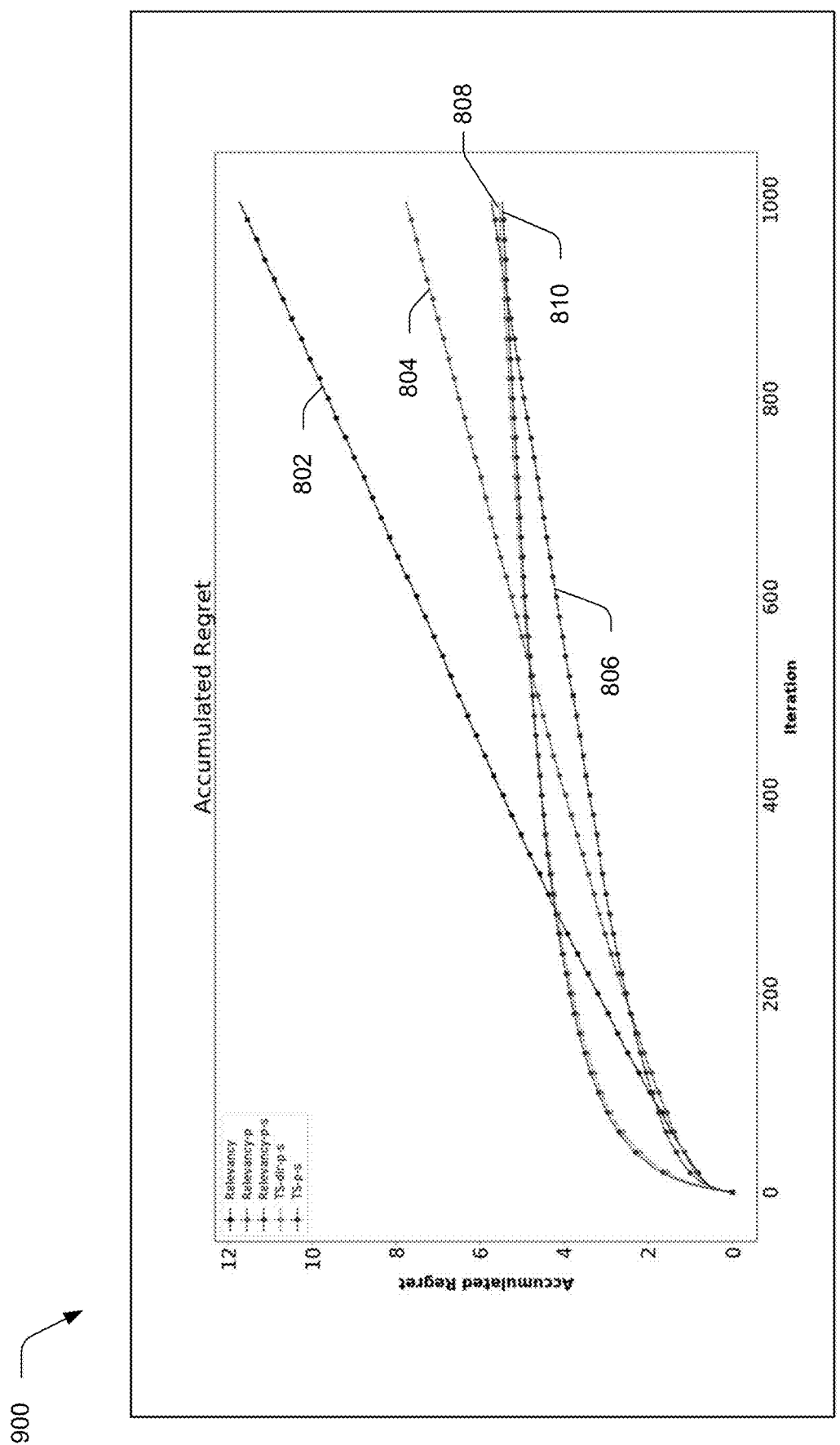
FIG. 9 is an illustration of an example representation of accumulated regret after iterations of recommendations using conventional systems and the described systems and techniques as numbers of iterations increase.

FIG. 9 is an illustration of an example representation 900 of accumulated regret after iterations of recommendations using conventional systems and the described systems and techniques as numbers of iterations increase. The representation 900 includes the accumulated regret 802 corresponding to the conventional system. The representation 900 also includes the accumulated regrets 804-810 which correspond to the same described systems of the example illustrated in FIG. 8. As shown, the described systems and techniques represent further improvements to computer-based recommendation generation technology as the number of iterations increases. As the number of iterations approaches 1000, the described systems corresponding to accumulated regrets 806-810 demonstrate an order of magnitude of improvement relative to the conventional system which corresponds to the accumulated regret 802.

Figure 10:
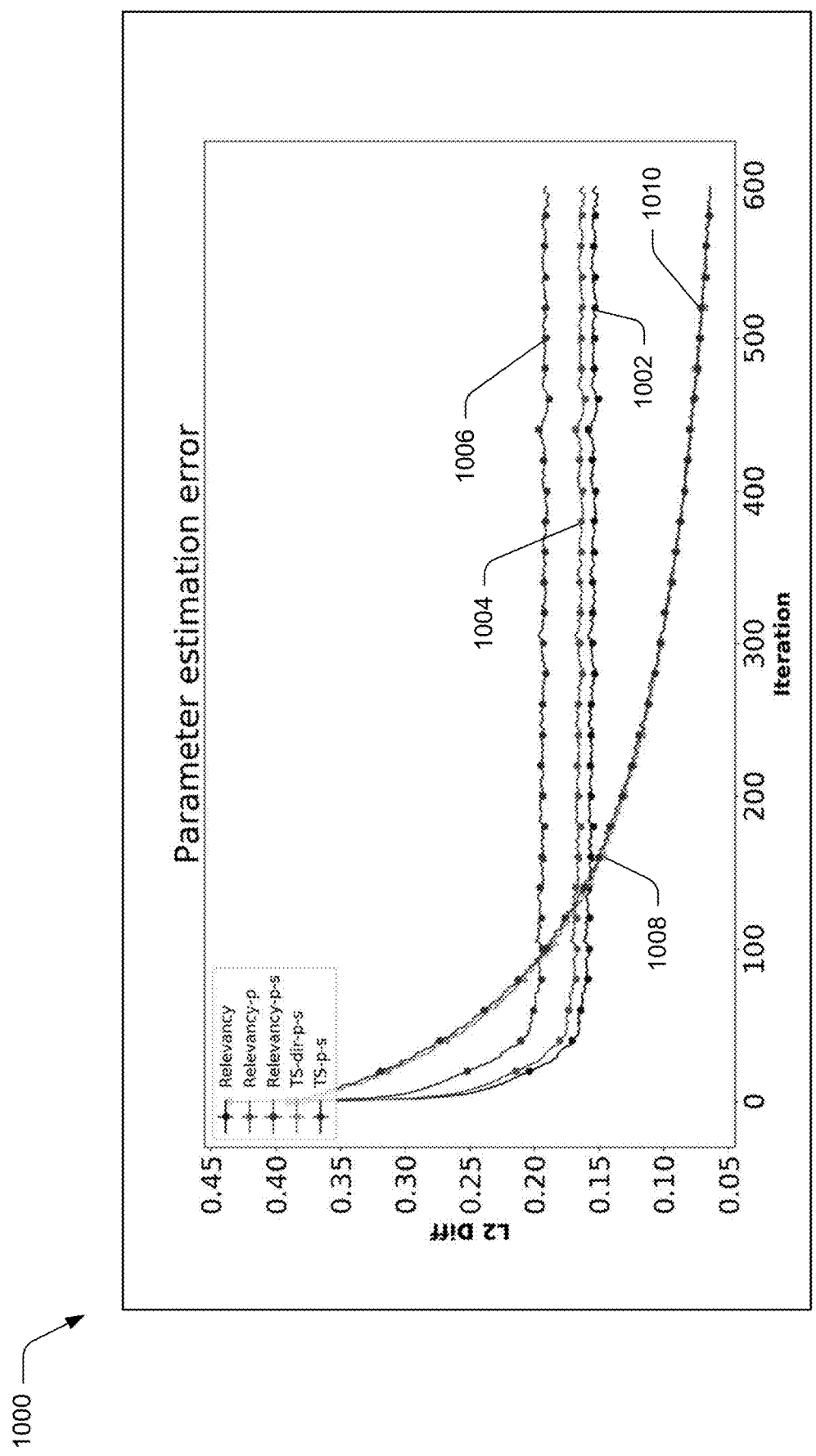
FIG. 10 is an illustration of an example representation of parameter estimation error after iterations of recommendations using conventional systems and the described systems and techniques.

FIG. 10 is an illustration of an example representation 1000 of parameter estimation error after iterations of recommendations using conventional systems and the described systems and techniques. As shown, parameter estimation error 1002 corresponds to the conventional system. Parameter estimation errors 1004-1010 correspond to one of the described systems. As shown, parameter estimation errors 1008 and 1010 are lower than parameter estimation error 1002 before the first 200 iterations.

Figure 11:
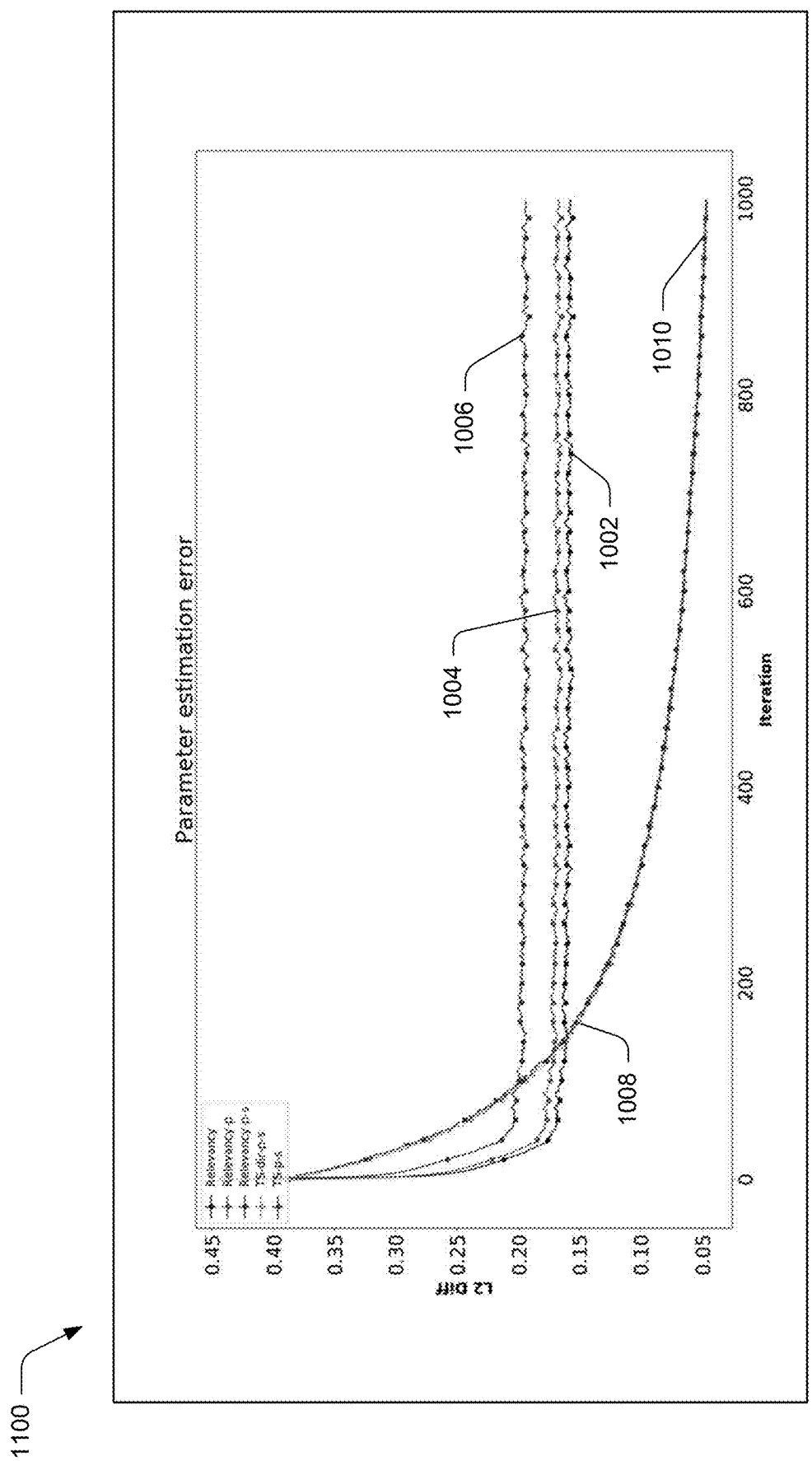
FIG. 11 is an illustration of an example representation of parameter estimation error after iterations of recommendations using conventional systems and the described systems and techniques as numbers of iterations increase.

FIG. 11 is an illustration of an example representation 1100 of parameter estimation error after iterations of recommendations using conventional systems and the described systems and techniques as numbers of iterations increase. Parameter estimation error 1002 corresponds to the conventional system. Parameter estimation errors 1004-1010 correspond to one of the described systems. As illustrated, parameter estimation errors 1008 and 1010 become orders of magnitude lower than parameter estimation error 1002 as the number of iterations increase.

Figure 12:
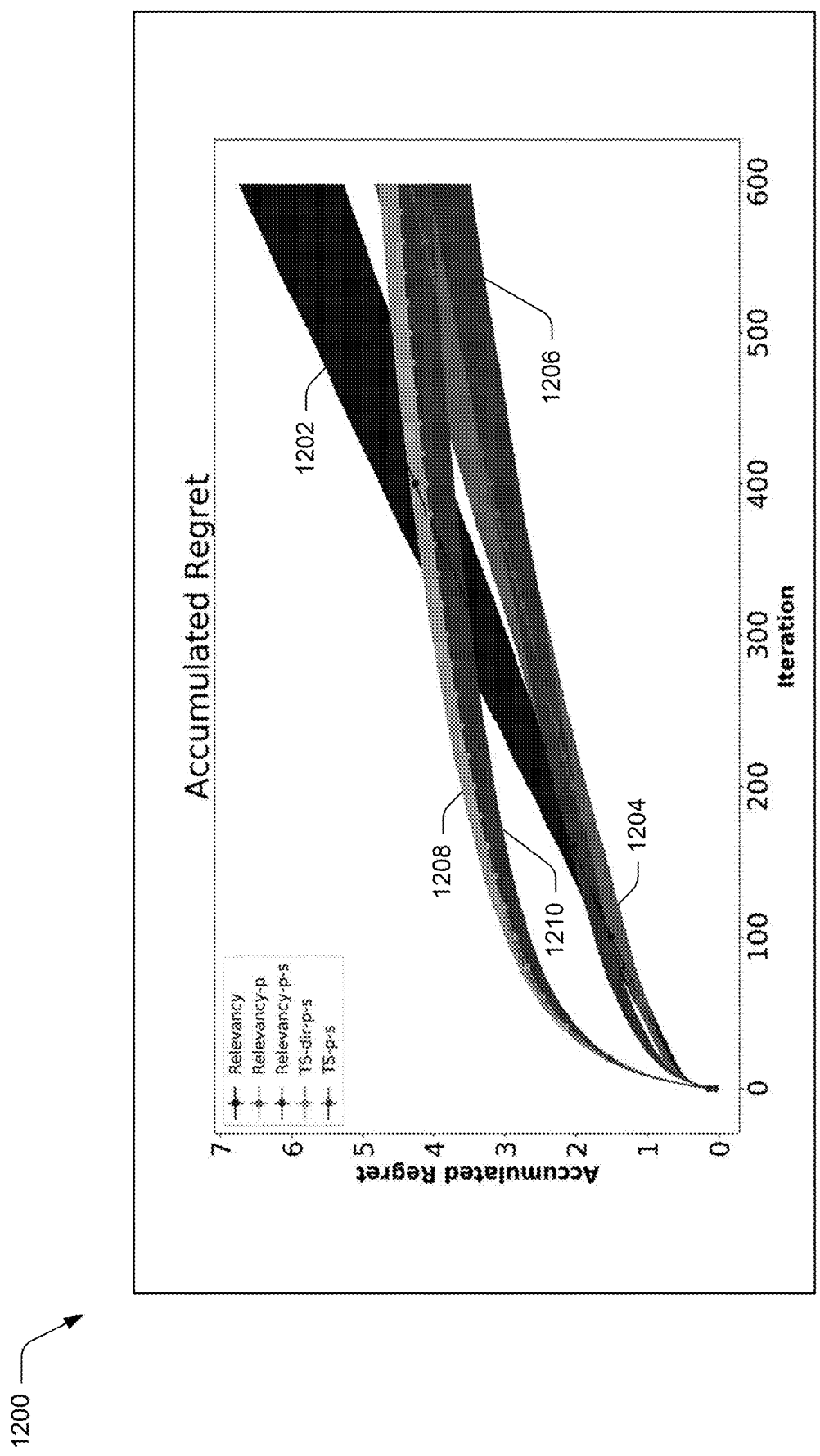
FIG. 12 is an illustration of an example representation of a sample of 300 entities.

FIG. 12 is an illustration of an example representation 1200 of a sample of 300 entities. The representation 1200 includes accumulated regret 1202 which corresponds to the conventional systems. The representation also includes accumulated regrets 1204-1210 which correspond to the described systems.

Figure 13:
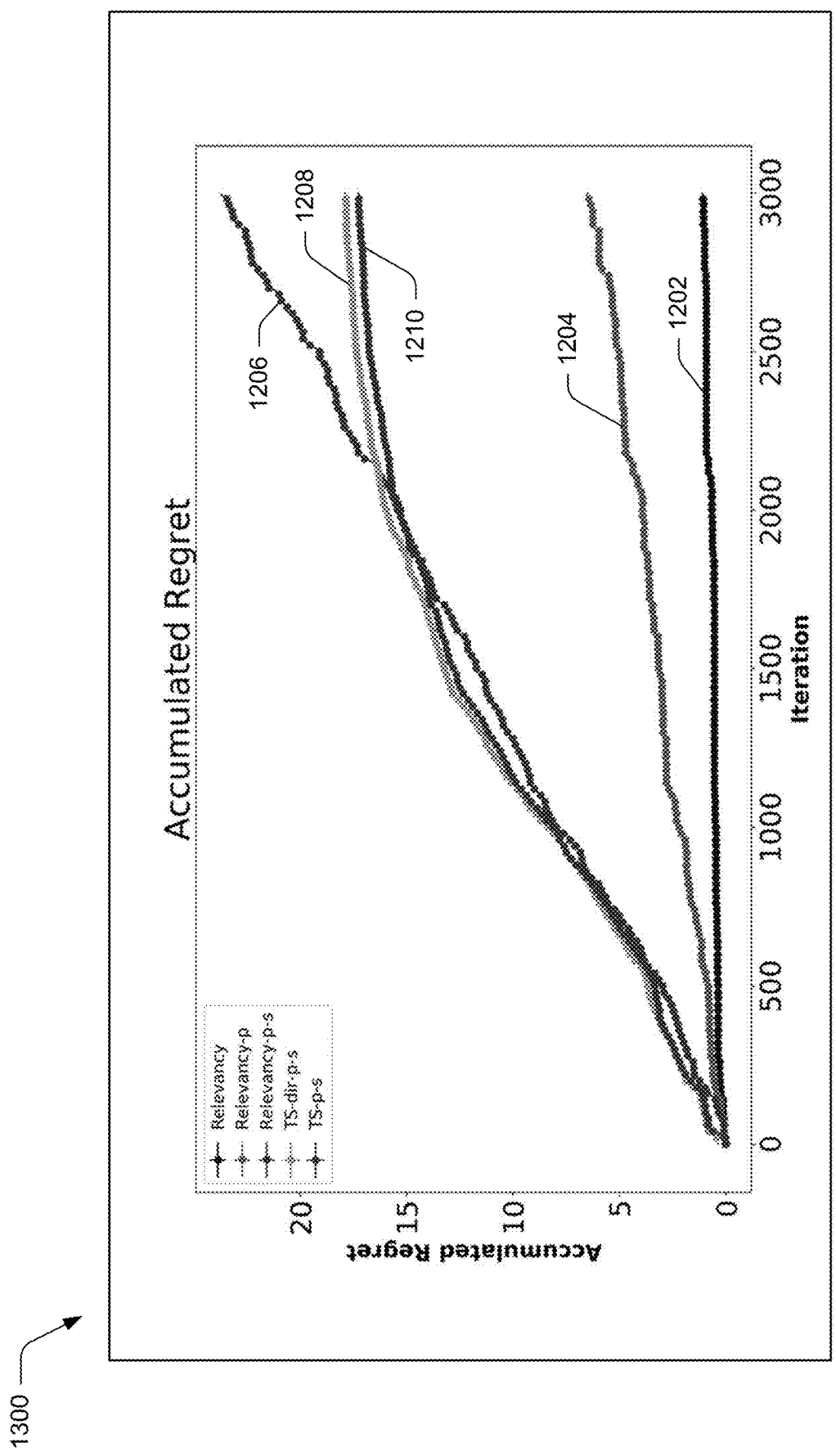
FIG. 13 is an illustration of an example representation of a closest entity to an average top 10 entities from the sample of 300 entities.

FIG. 13 is an illustration of an example representation 1300 of a closest entity to an average top 10 entities from the sample of 300 entities. This closest entity is the closest entity to the average top 10 entities of the 300 entity sample based on L1 Norm. Specifically, the representation 1300 illustrates accumulated regret based on recommendations made to the closest entity using the conventional systems and the described systems. Accumulated regret 1202 corresponds to the conventional systems. Accumulated regrets 1204-1210 correspond to the described systems. As expected, the accumulated regret 1202 is low because the conventional systems are designed to make recommendations based on closeness between interactions with items by entities which is a shortcoming of the conventional systems.

Figure 14:
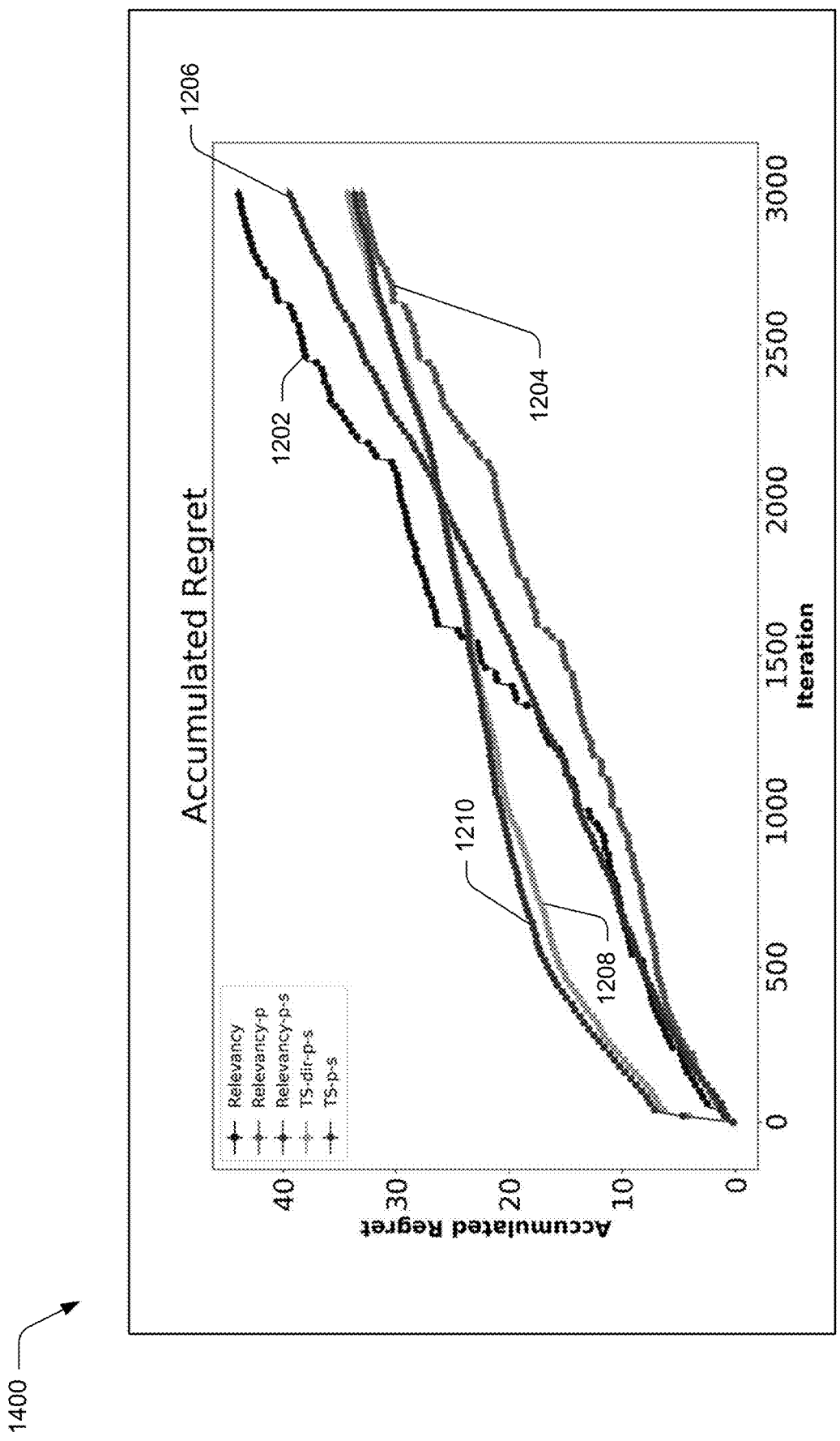
FIG. 14 is an illustration of an example representation of a furthest entity from the average top 10 entities from the sample of 300 entities.

FIG. 14 is an illustration of an example representation 1400 of a furthest entity from the average top 10 entities from the sample of 300 entities. This furthest entity is the furthest entity from the average top 10 entities of the sample based on L1 Norm. Specifically, the representation 1400 illustrates accumulated regret based on recommendations made to the furthest entity using the conventional systems and the described systems. Accumulated regret 1202 corresponds to the conventional systems. Accumulated regrets 1204-1210 correspond to the described systems. As expected, the accumulated regret 1202 is high because the conventional systems are designed to make recommendations based on closeness between interactions with items by entities which is a shortcoming of the conventional systems.

Figure 15:
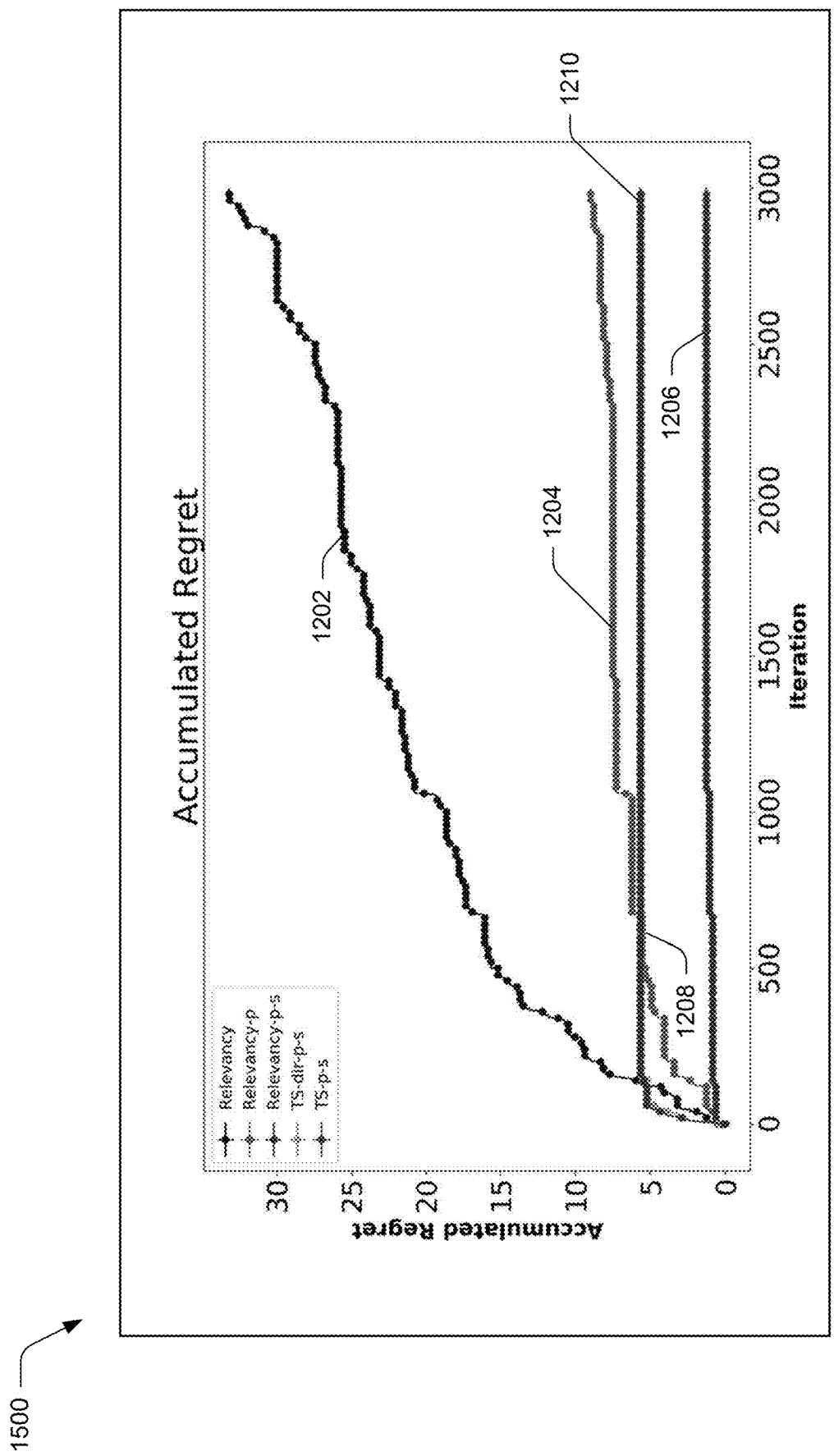
FIG. 15 is an illustration of an example representation of a median entity to the average top 10 entities from the sample of 300 entities.

FIG. 15 is an illustration of an example representation 1500 of a median entity to the average top 10 entities from the sample of 300 entities. This median entity is the median entity relative to the average top 10 entities of the sample of the 300 entities based on L1 Norm. Specifically, the representation 1500 illustrates accumulated regret based on recommendations made to the median entity using the conventional systems and the described systems. In this mariner, the representation 1500 reflects a "fair" comparison between the conventional systems and the described systems.

As illustrated, accumulated regret 1202 corresponds to the conventional systems. Accumulated regrets 1204-1210 correspond to the described systems. Each of the described systems corresponding to one of the accumulated regrets 1204-1210 represents a significant improvement over the conventional systems corresponding to the accumulated regret 1202. This is because each of the accumulated regrets 1204-1210 is less than the accumulated regret 1202 after a few hundred iterations. Thus, the described systems represent a significant improvement to conventional computer-based technology for generating recommendations as the described systems result in significantly less accumulated regret than conventional systems for generating recommendations.

Example System and Device

Figure 16:
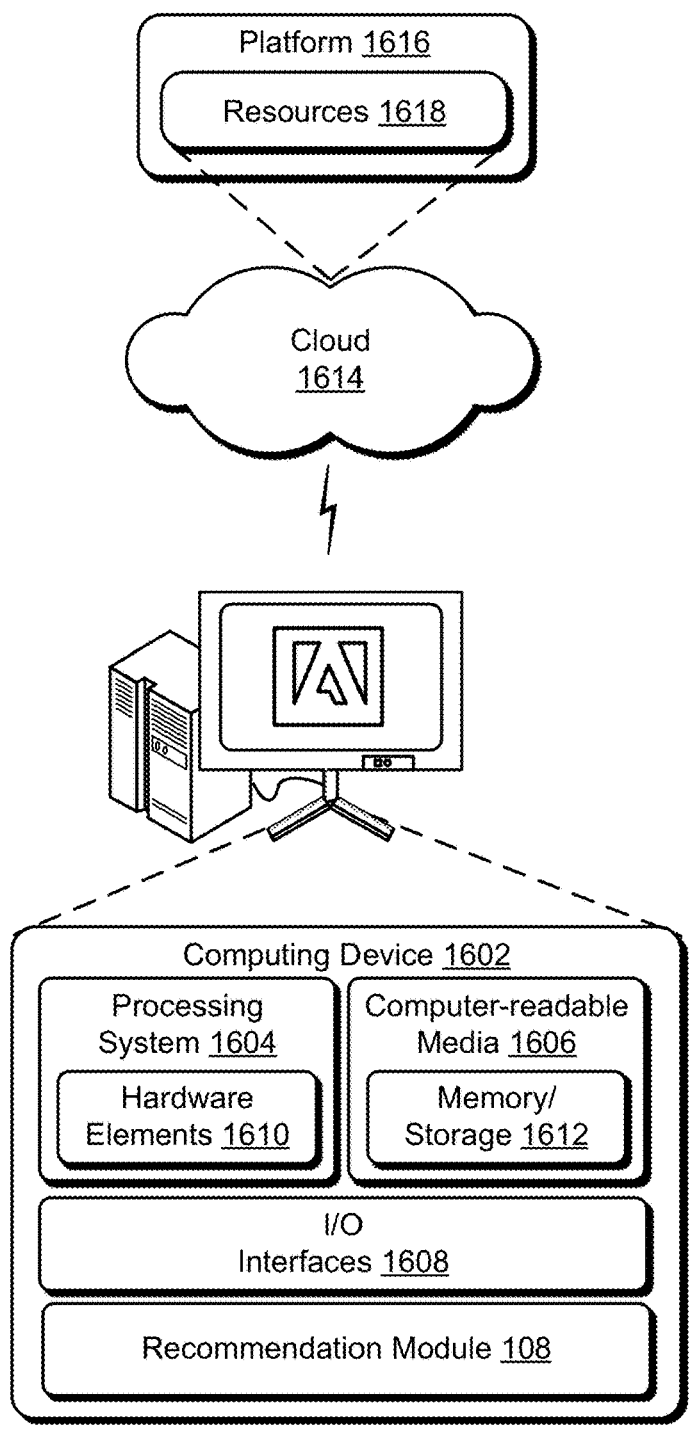
FIG. 16 illustrates an example system that includes an example computing device that is representative of one or more computing systems and/or devices that may implement the various techniques described herein.

FIG. 16 illustrates an example system 1600 that includes an example computing device that is representative of one or more computing systems and/or devices that may implement the various techniques described herein. This is illustrated through inclusion of the recommendation module 108. The computing device 1602 may be, for example, a server of a service provider, a device associated with a client (e.g., a client device), an on-chip system, and/or any other suitable computing device or computing system.

The example computing device 1602 as illustrated includes a processing system 1604, one or more computer-readable media 1606, and one or more I/O interfaces 1608 that are communicatively coupled, one to another. Although not shown, the computing device 1602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1604 is representative of functionality to perform one or more operations using hardware. Accordingly, the processing system 1604 is illustrated as including hardware elements 1610 that may be configured as processors, functional blocks, and so forth. This may include implementation in hardware as an application specific integrated circuit or other logic device formed using one or more semiconductors. The hardware elements 1610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1606 is illustrated as including memory/storage 1612. The memory/storage 1612 represents memory/storage capacity associated with one or more computer-readable media. The memory/storage component 1612 may include volatile media (such as random access memory (RAM)) and/or nonvolatile media (such as read only memory (ROM), Flash memory, optical disks, magnetic disks, and so forth). The memory/storage component 1612 may include fixed media (e.g., RAM, ROM, a fixed hard drive, and so on) as well as removable media (e.g., Flash memory, a removable hard drive, an optical disc, and so forth). The computer-readable media 1606 may be configured in a variety of other ways as further described below.

Input/output interface(s) 1608 are representative of functionality to allow a user to enter commands and information to computing device 1602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1610 and computer-readable media 1606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1610. The computing device 1602 may be configured to implement particular instructions and/or functions corresponding to the software and/or hardware modules. Accordingly, implementation of a module that is executable by the computing device 1602 as software may be achieved at least partially in hardware, e.g., through use of computer-readable storage media and/or hardware elements 1610 of the processing system 1604. The instructions and/or functions may be executable/operable by one or more articles of manufacture (for example, one or more computing devices 1602 and/or processing systems 1604) to implement techniques, modules, and examples described herein.

The techniques described herein may be supported by various configurations of the computing device 1602 and are not limited to the specific examples of the techniques described herein. This functionality may also be implemented all or in part through use of a distributed system, such as over a "cloud" 1614 as described below.

The cloud 1614 includes and/or is representative of a platform 1616 for resources 1618. The platform 1616 abstracts underlying functionality of hardware (e.g., servers) and software resources of the cloud 1614. The resources 1618 may include applications and/or data that can be utilized while computer processing is executed on servers that are remote from the computing device 1602. Resources 1618 can also include services provided over the Internet and/or through a subscriber network, such as a cellular or Wi-Fi network.

The platform 1616 may abstract resources 1618 and functions to connect the computing device 1602 with other computing devices. The platform may also serve to abstract scaling of resources to provide a corresponding level of scale to encountered demand for the resources that are implemented via the platform. Accordingly, in an interconnected device embodiment, implementation of functionality described herein may be distributed throughout the system 1600. For example, the functionality may be implemented in part on the computing device 1602 as well as via the platform 1616 that abstracts the functionality of the cloud 1614.

Conclusion

Although implementations of systems for generating recommendations have been described in language specific to structural features and/or methods, it is to be understood that the appended claims are not necessarily limited to the specific features or methods described. Rather, the specific features and methods are disclosed as example implementations of systems for generating recommendations, and other equivalent features and methods are intended to be within the scope of the appended claims. Further, various different examples are described and it is to be appreciated that each described example can be implemented independently or in connection with one or more other described examples.

What is claimed is:

1. In a digital medium environment to generate a recommendation, a method implemented by a computing device, the method comprising:
   receiving, by a segment module, prior interaction data describing entity devices and prior interactions of the entity devices with items;
   processing, by the segment module, the prior interaction data to segment the entity devices into a first set and a second set, entity devices included in the first set having greater numbers of prior interactions with the items than entity devices included in the second set;

scaling, by a scaling module, numbers of prior interactions with the items of the entity devices included in the first set by determining a maximum number of the numbers of prior interactions with the items of the entity devices included in the first set;

generating, by a subset module, subset data describing a subset of the entity devices in the first set, the subset excluding entity devices having scaled numbers of prior interactions with the items below a threshold;

forming, by a relevancy module, a recommendation model using the subset data as a prior probability distribution of a Bayesian statistical inference and summing scaled numbers of prior interactions with the items of entity devices included in the subset as a global vector;

generating, by the relevancy module, a scaled global vector by scaling the global vector to be within a range determined based on a statistical guarantee;

normalizing, by the relevancy module, the scaled global vector and a current interaction vector as normalized vectors; and generating, by the relevancy module, the recommendation for display in a user interface using the normalized vectors and the recommendation model.

2. The method as described in claim 1, wherein forming the recommendation model includes sampling from a Dirichlet multinomial distribution.

3. The method as described in claim 1, wherein forming the recommendation model includes Thompson sampling.

4. The method as described in claim 1, wherein the items are items of digital content.

5. The method as described in claim 1, wherein the numbers of prior interactions with the items of the entity devices included in the first set are scaled between 0 and 1.

6. The method as described in claim 5, further comprising determining the threshold based on the scaling.

7. The method as described in claim 1, further comprising:
receiving current interaction data describing a current interaction with an item of the items; and
generating the current interaction vector based on the current interaction data.

8. The method as described in claim 1, further comprising dividing the numbers of prior interactions with the items of the entity devices included in the first set by the maximum number.

9. The method as described in claim 1, further comprising generating a preference vector for the items by:
adding the normalized vectors; and
normalizing the normalized vectors.

10. One or more non-transitory computer-readable storage media comprising instructions stored thereon that, responsive to execution by a computing device in a digital medium environment to generate a recommendation, cause operations of the computing device including:
receiving prior interaction data describing entity devices and prior interactions of the entity devices with items;
processing the prior interaction data by segmenting the entity devices into a first set and a second set, entity devices included in the first set having greater numbers of prior interactions with the items than entity devices included in the second set;
scaling numbers of prior interactions with the items of the entity devices included in the first set by determining a maximum number of the numbers of prior interactions with the items of the entity devices included in the first set and dividing the numbers of prior interactions with the items of the entity devices included in the first set by the maximum number;
generating subset data describing a subset of the entity devices in the first set, the subset excluding entity devices having scaled numbers of prior interactions with the items below a threshold;
forming a recommendation model using the subset data as a prior probability distribution of a Bayesian statistical inference and summing scaled numbers of prior interactions with the items of entity devices included in the subset as a global vector;
generating a scaled global vector by scaling the global vector to be within a range determined based on a statistical guarantee;
receiving current interaction data describing a current interaction with an item of the items;
generating a current interaction vector based on the current interaction data;
normalizing the scaled global vector and the current interaction vector as normalized vectors; and
generating the recommendation for display in a user interface using the normalized vectors and the recommendation model.

11. The one or more non-transitory computer-readable storage media as described in claim 10, wherein forming the recommendation model includes sampling from a Dirichlet multinomial distribution.

12. The one or more non-transitory computer-readable storage media as described in claim 10, wherein forming the recommendation model includes Thompson sampling.

13. The one or more non-transitory computer-readable storage media as described in claim 12, wherein beta priors for Bernoulli arms are set using the scaled global vector.

14. The one or more non-transitory computer-readable storage media as described in claim 10, wherein the numbers of prior interactions with the items of the entity devices included in the first set are scaled between 0 and 1.

15. The one or more non-transitory computer-readable storage media as described in claim 10, wherein the threshold is determined based on scaling the numbers of prior interactions with the items of the entity devices included in the first set.

16. In a digital medium environment to generate a recommendation, a system comprising:
one or more processors of a processing system; and
a computer-readable storage medium having instructions stored thereon that, responsive to execution by the processing system, causes the one or more processors to perform operations including:
receiving prior interaction data describing entity devices and prior interactions of the entity devices with items;
segmenting the entity devices into a first set and a second set, entity devices included in the first set having greater numbers of prior interactions with the items than entity devices included in the second set;
scaling numbers of prior interactions with the items of the entity devices included in the first set by determining a maximum number of the numbers of prior interactions with the items of the entity devices included in the first set;
generating subset data describing a subset of the entity devices included in the first set, the subset excluding entity devices having scaled numbers of prior interactions with the items below a threshold;

forming a recommendation model using the subset data as a prior probability distribution of a Bayesian statistical inference and summing scaled numbers of prior interactions with the entity devices included in the subset as a global vector;

generating a scaled global vector by scaling the global vector to be within a range determined based on a statistical guarantee;

normalizing the scaled global vector and a current interaction vector as normalized vectors; and generating the recommendation for display in a user interface using the normalized vectors and the recommendation model.

17. The system as described in claim 16, wherein forming the recommendation model includes sampling from a Dirichlet multinomial distribution.

18. The system as described in claim 16, wherein forming the recommendation model includes Thompson sampling.

19. The system as described in claim 16, wherein the numbers of prior interactions with the items of the entity devices in the first set are scaled between 0 and 1.

20. The system as described in claim 16, wherein the items are products or services.

* * * * *